UNITED STATES PATENT OFFICE.

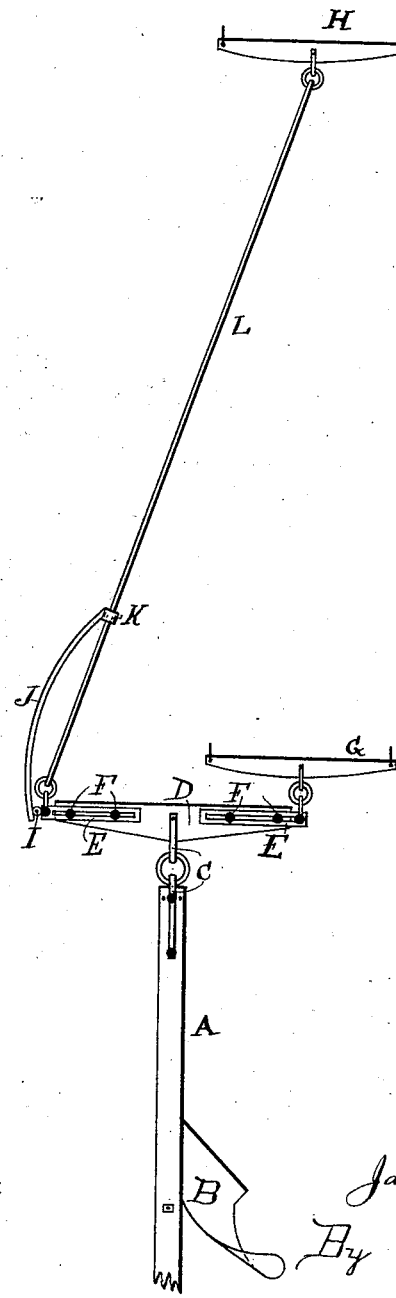

JAMES L. PEARSON, OF LODI, CALIFORNIA.

PLOW.

SPECIFICATION forming part of Letters Patent No. 507,282, dated October 24, 1893.

Application filed May 29, 1893. Serial No. 475,944. (No model.)

*To all whom it may concern:*

Be it known that I, JAMES L. PEARSON, a citizen of the United States, residing at Lodi, in the county of San Joaquin and State of California, have invented certain new and useful Improvements in Plows; and I do declare the following to be a full, clear, and exact description of the invention, such as will enable others skilled in the art to which it appertains to make and use the same, reference being had to the accompanying drawing, and to the letters of reference marked thereon, which forms a part of this specification.

My invention relates to an improvement in the draft device of orchard and vineyard plows; and it consists in the devices and combination of devices as will be fully explained in the specification and pointed out in the claims.

The figure is a plan of a plow and of my improved draft device attached thereto; the handles of the plow being broken away.

A, is the beam and B, is the mold board of a plow.

C, are clevises which may be adjusted horizontally, and are attached to the forward end of the plow-beam and to the center of a doubletree D. The two clevises are connected by a ring. Near the ends of the doubletree D, are attached by means of bolts F, adjustable slotted iron bars E. To the outer end of the doubletree D, is attached by means of the usual clevises, a singletree G, to which is attached one of the team horses. To the inner bar E, a rope or chain L, is attached by means of clevises and which extends forwardly to a point directly in front of the horse which is attached to the singletree G. To the outer end of the rope or chain L, is attached a singletree H, to which is attached the second team horse.

J, is a shield for the purpose of protecting the trees from the end of the doubletree, it being attached near the inner end of the doubletree D, by means of a hinge I.

K, is a lug, which is attached to the outer end of the shield and is provided with a guide through which the rope or chain L passes.

I have shown my device in use to throw the earth when plowing, from the row of trees or vines. In order to throw the earth toward the trees or vines, the clevis C, is detached from the plow beam A and the doubletree D, to be turned end for end and again attached to the beam A. It will thus readily appear that by the use of my improved draft device in connection with a suitable plow, the furrow may be made in very close proximity to the trees and vines of an orchard.

Having thus described my invention, what I claim as new, and desire to secure by Letters Patent, is—

1. In a draft device, the combination with the beam A and the mold board B, of the clevises C, the doubletree D, the adjustable slotted bars E, the bolts F, the singletree G, attached to the outer bar E, the rope or chain L attached to the inner bar E, and extending forwardly, the singletree H attached to the forward end of the rope or chain L, and the guard J, attached to the inner bar E and provided with the guide lug K, all arranged and operating substantially as shown and described.

2. In a draft device, the combination with a plow and plowbeam of a doubletree, suitably attached to such plowbeam, a singletree attached to one end of such doubletree, a rope or chain attached to the other end of the doubletree and a singletree attached to the end of such rope or chain, said rope or chain being of a length sufficient to allow the horse attached thereto to travel in front of the horse attached to the singletree on one end of the doubletree, whereby one draft animal may travel directly in front of the other, all substantially as shown and described.

3. In a draft device, the combination, substantially as described with the beam of a plow of a doubletree attached to the end of the beam by clevises, adjustable slotted bars attached by bolts to the ends of said doubletree, a singletree attached to the outer adjustable slotted bar, a rope or chain attached to the inner adjustable slotted bar and extending forwardly, a singletree attached to the forward end of such rope or chain and a shield hinged at one end to the inner adjustable slotted bar and held in position at its other end by the aforesaid rope or chain.

In testimony whereof I affix my signature in presence of two witnesses.

JAMES L. PEARSON.

Witnesses:
JOSHUA B. WEBSTER,
JAMES T. SUMMERVILLE.